Patented Aug. 16, 1932

1,871,530

UNITED STATES PATENT OFFICE

CHARLES WILLIAM KELLER, OF BELLEFONTE, PENNSYLVANIA, ASSIGNOR TO AMERICAN LIME AND STONE COMPANY, OF BELLEFONTE, PENNSYLVANIA, A CORPORATION OF PENNSYLVANIA

METHOD OF PRODUCING HYDRATED LIME

No Drawing.    Application filed April 3, 1931. Serial No. 527,619.

This invention relates to hydration of lime, and more particularly to the hydration of high calcium or quick-acting limes. By the term "lime" I will be understood as referring to calcined products having a sufficiently high CaO content to cause a chemical combination upon the addition of water resulting in the formation of calcium hydrates.

In the usual process of hydrating limes, water is added to the previously pulverized oxide in quantities usually approximating 60 percent by weight of the oxide. Of this water only one-half, or 30 percent by weight of the oxide, combines with the oxide in producing the hydrate, the balance being driven off by the heat generated in the reaction in the form of steam. The total heat of the formation is absorbed in heating the mass of the oxide, with its impurities, and the total amount of water used in hydration to the vaporizing temperature, and in supplying heat for the vaporization of the excess water. Where the lime employed is rapid in its response to the addition of water the mass of lime is immediately converted into a hot, stiff dough-like material. This renders hydration difficult in that the mixture is extremely difficult to mix or plough, interfering with the operation of the hydrator. Furthermore, the lime frequently has a setting or hardening tendency aggravating this condition. Such a condition is present in the hydration of practically all limes having a sufficiently high calcium content to render it difficult to secure a physical mix of the water with the lime before the reaction takes place, and it is particularly noticeable in high calcium limes and especially so in limes calcined in rotary kilns.

I have discovered that by dividing the hydration process into two stages, these difficulties are avoided and a better quality product obtained. By my method, from 1 to 75 percent of the total water which is to be added to the lime to complete hydration thereof, or approximately 1 to 45 percent by weight of the lime is first added thereto and after the reaction has taken place, and preferably following a cooling period succeeding this reaction, the balance of the water is added and the hydration completed. Best results are noted when approximately twenty-four percent by weight of water is added to the lime in the initial step of hydration and the additional water added to complete the hydration after a minimum period of two hours following the first stage of hydration. The longer the period between the first and second stages and the cooler the lime becomes between these stages, the more improved the final product.

By following this process I find that it is possible to increase the amount of fines in the final product by 30 percent, thus materially reducing the amount of processing necessary to render the product marketable and likewise reducing the amount of refuse resulting. I have found, furthermore, that this process eliminates dust ejection by at least fifty percent, permits carrying forward of the process of hydration at at least twice the speed, thus increasing production capacity, renders the separation of the fines by means of air separation or classification possible, thus reducing the amount of rejected material by more than fifty percent and increasing bulking of the material by approximately six percent. The product has a settling rate in water five percent slower than hydrates produced by single-stage hydration, thus showing a decrease in particle size rendering the same more quickly available when employed in chemical reactions. It may be here pointed out that the amount of water employed in hydration by the two-stage method is less than that employed in single-stage hydration due to the fact that a goodly percentage of the heat of reaction is dissipated between the stages of hydration.

Since the process herein outlined is capable of a considerable range of modification without in any manner departing from the spirit of my invention, I do not wish to be understood as limiting myself thereto except as hereinafter claimed.

I claim:

1. The process of hydrating lime consisting in performing the hydration in two stages in each of which a portion of the water necessary to hydration is added and between which stages the lime is permitted to rest through a period sufficient to effect the reaction resulting from the water being initially added.

2. The process of hydrating lime consisting in performing the hydration in two stages in each of which a portion of the water necessary to hydration is added, and between which the lime is permitted to cool.

3. The process of hydrating lime consisting in initially adding thereto water in amounts not exceeding forty-five percent by weight of the lime, permitting the water and lime to react to the full extent possible with the water added thereto and then adding thereto sufficient water to complete hydration of the lime.

4. A process as outlined in claim 3 wherein the lime is permitted to cool prior to the addition of water to complete the hydration.

5. The process of hydrating lime consisting in initially adding thereto twenty-four percent by weight of water, permitting the water and lime to react to the full extent possible with the water added thereto and after completion of the reaction adding thereto sufficient water to complete the hydration of the lime.

6. The process as outlined in claim 5 wherein the lime is permitted to cool before the addition of the water to complete the hydration.

CHARLES WILLIAM KELLER.